United States Patent
Gargi et al.

(10) Patent No.: US 8,782,002 B2
(45) Date of Patent: Jul. 15, 2014

(54) DISTRIBUTED PROCESSING WITH METADATA PLACEHOLDERS

(75) Inventors: Ullas Gargi, San Jose, CA (US); Peng Wu, San Jose, CA (US); Pere Obrador, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2240 days.

(21) Appl. No.: 11/280,518

(22) Filed: Nov. 16, 2005

(65) Prior Publication Data

US 2007/0112779 A1    May 17, 2007

(51) Int. Cl.
*G06F 7/00*    (2006.01)
(52) U.S. Cl.
USPC ............................................ 707/613; 707/769
(58) Field of Classification Search
CPC ................. G06F 17/30289; G06F 17/30194
USPC .................... 707/769, 613, 999.103, 999.104
See application file for complete search history.

(56) References Cited

U.S. PATENT DOCUMENTS

| | | | |
|---|---|---|---|
| 7,932,928 B2 * | 4/2011 | Koizumi et al. | 348/222.1 |
| 2003/0125976 A1 * | 7/2003 | Nguyen et al. | 705/1 |
| 2004/0019613 A1 * | 1/2004 | Jones et al. | 707/200 |
| 2004/0135889 A1 * | 7/2004 | Koizumi et al. | 348/207.1 |
| 2004/0194026 A1 * | 9/2004 | Barrus et al. | 715/515 |
| 2005/0209983 A1 * | 9/2005 | MacPherson | 707/1 |

OTHER PUBLICATIONS http://archive.dstc.edu.au/RDU/staff/jane-hunter/PNG/paper.html.

* cited by examiner

*Primary Examiner* — Hung T Vy

(57) ABSTRACT

Metadata placeholders are used for distributed processing. The metadata placeholders are added to digital objects. The placeholders are filled with requests to perform certain downstream processing on the objects. The placeholders are at least partially empty so they can be filled in by nodes that perform the downstream processing.

21 Claims, 3 Drawing Sheets

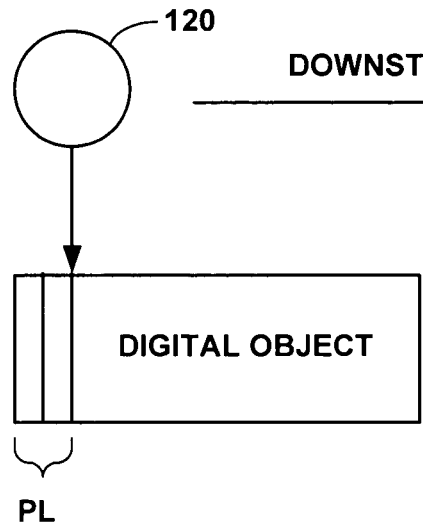
FIG. 3
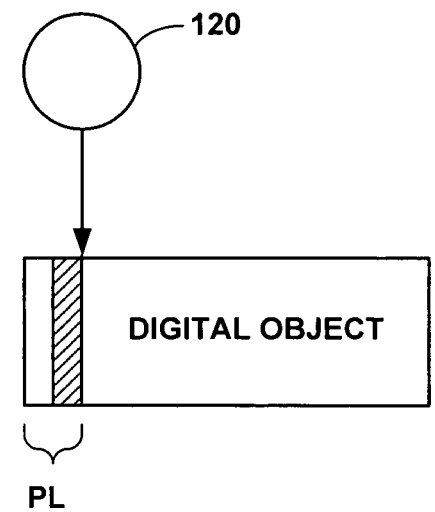
FIG. 5
FIG. 6
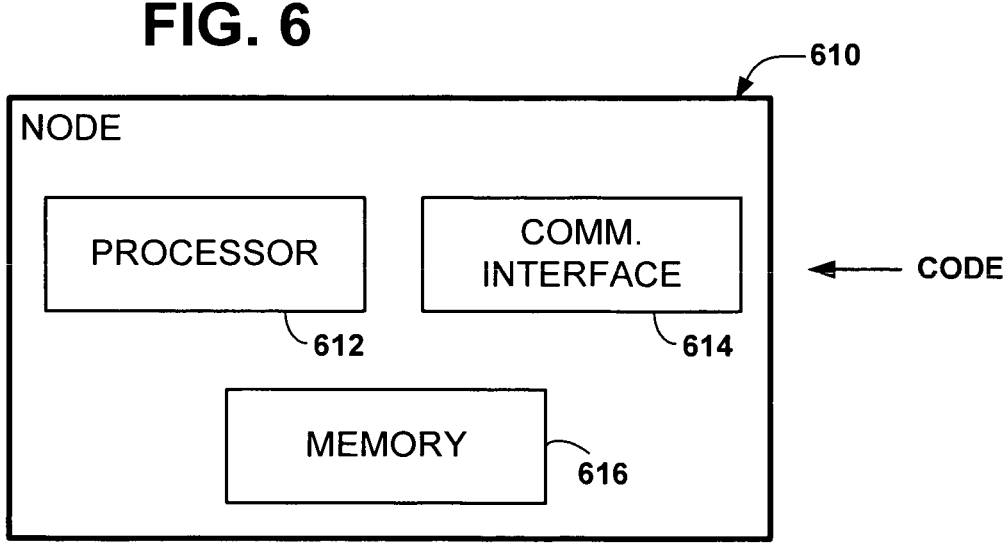

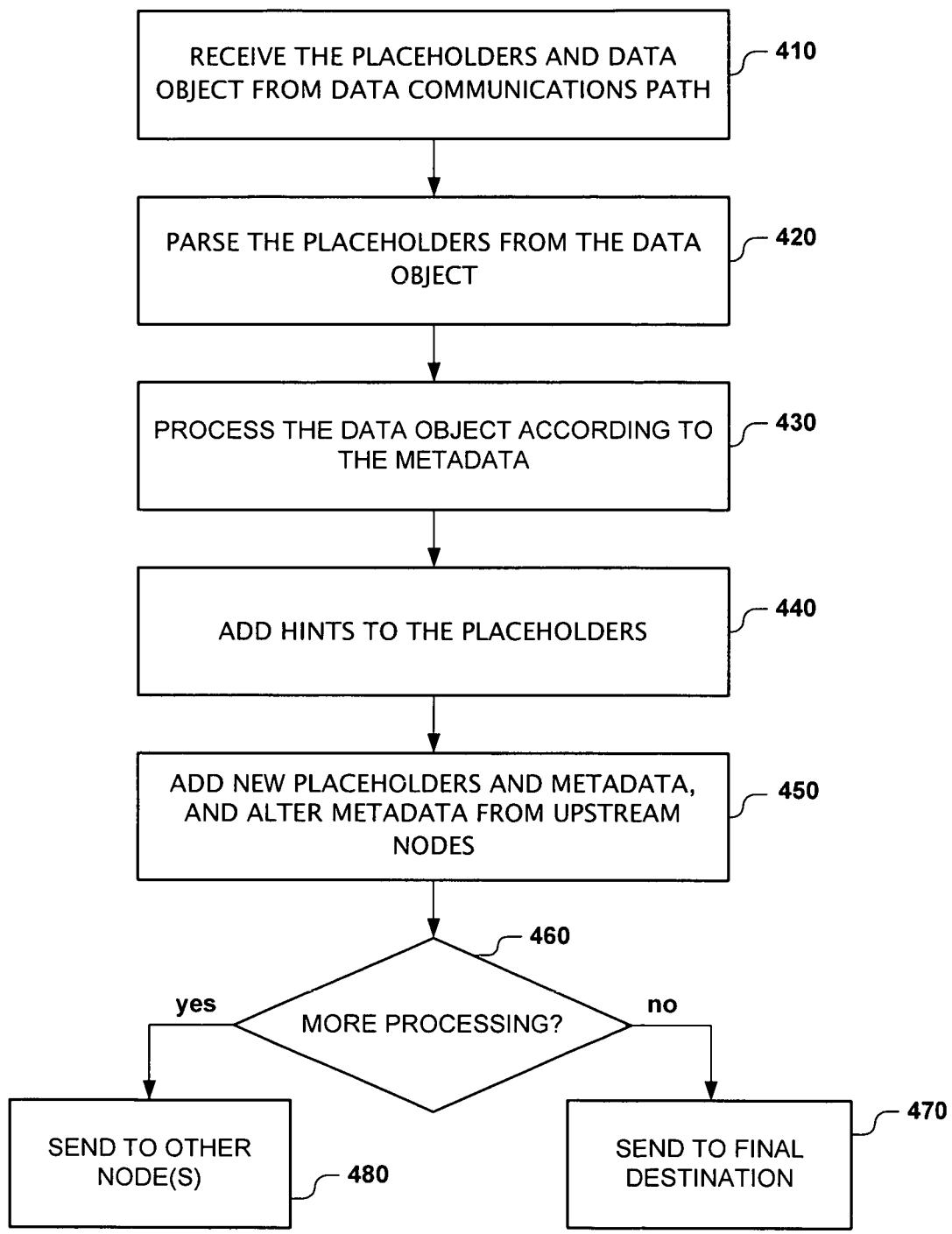

DISTRIBUTED PROCESSING WITH METADATA PLACEHOLDERS

BACKGROUND

Metadata can be used to provide descriptive information about digital objects. Metadata is usually added to digital objects by devices and applications that actually generate the metadata. Subsequently, the metadata can be overwritten, deleted or modified by other devices and applications that receive the digital objects.

Different metadata formats are available for different types of digital media content. For instance, ID3 is a tagging format for MP3s. This tagging format allows metadata such as title, artist, album, and track number to be added to MP3 files.

The Exchangeable Image File (EXIF) format is an international specification for encoding metadata into the headers and application segments of JPEG files. This metadata includes shutter speed, aperture, and the date and time of image capture.

JPSearch is a new standardization activity occurring within the JPEG 2000 community. The JPSearch standard "aims to specify additional metadata and related functionalities to support the implementation of a flexible and efficient still image search."

SUMMARY

According to one aspect of the present invention, static metadata placeholders are used for distributed processing of digital objects. The metadata placeholders are added to the digital objects. The placeholders are filled with requests to perform certain downstream processing on the digital objects. The placeholders are at least partially empty so they can be filled in by nodes that perform the downstream processing.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIGS. 2 and 3 are illustrations of preparing a digital object for processing in accordance with an embodiment of the present invention.

FIGS. 4 and 5 are illustrations of downstream processing of a digital object in accordance with an embodiment of the present invention.

FIG. 6 is an illustration of a node in accordance with an embodiment of the present invention.

DETAILED DESCRIPTION

Figure 1:
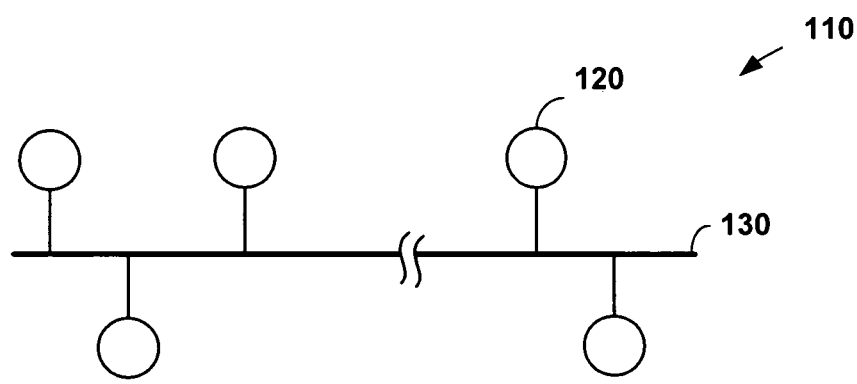
FIG. 1 is an illustration of a distributed processing system in accordance with an embodiment of the present invention.

Reference is made to FIG. 1, which illustrates a distributed processing system 110. The system 110 includes a plurality of electronic nodes 120 that can communicate directly or indirectly with each other via a data communications path 130. The nodes 120 may be diverse in terms of hardware and software. Different nodes 120 might have different processing power, memory, etc. Different nodes 120 might contain different hardware. Different nodes 120 might perform different types of processing. Some of the nodes 120 might be identical in terms of hardware and software, and some of the nodes 120 might provide processing that overlaps. In the aggregate, however, the different nodes 120 provide greater functions and processing capability than any single node 120 in the system 110.

The data communication path 130 is not limited to any particular type. For example, the data communication path 130 might include a local area network or the Internet. If the Internet is part of the data communications path 130, however, diversity of the nodes 120 will be greatly increased, since many different nodes 120 will be able to communicate with each other.

At least some of the nodes 120 recognize a format (which can be standard or proprietary) that allows metadata placeholders to be attached to digital objects and to be used for distributed processing. The placeholders include entries filled with metadata. The metadata includes requests to perform certain downstream processing on the objects. The placeholders are at least partially empty prior to downstream processing. That is, at least one of the placeholders is initially empty so it can be filled in with metadata by a node that performs the downstream processing. The metadata supplied by downstream nodes can also be altered and read by nodes further downstream.

"Downstream" refers to the flow of data. Downstream processing refers to processing that is performed on a digital object after metadata placeholders are added to it.

Digital objects are not limited to any particular type. Exemplary digital objects include, without limitation, digital media content (e.g., images, audio, video, 3D), ring tones, speech, and text documents A digital object could have the form of a file or a bit stream. The placeholders may be inserted in a file or bit stream. The location and identification of the placeholders in the file or bit stream is specified by the recognizable format.

Figure 2:
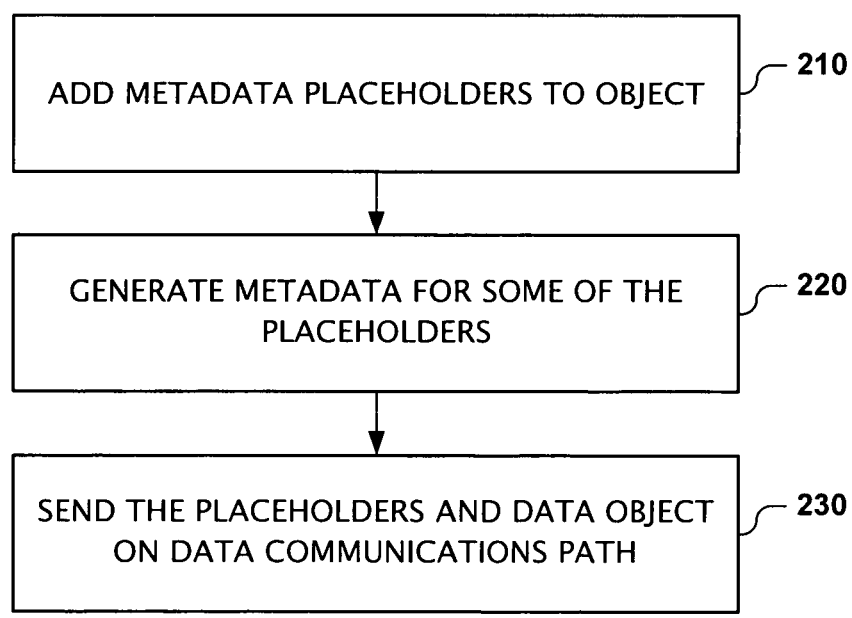

Reference is made to FIGS. 2 and 3. If a node 120 desires processing to be performed on a digital object, the node can add metadata placeholders (PL) to the digital object (block 210). This node 120 will be referred to as a "sending node." The placeholders are containers for metadata. The placeholders are empty until filled with the metadata. The following types of placeholders may be added.

1. Processing Requests/Directives
2. Conditions and attributes
3. Metadata hints
4. Reserved The sending node generates metadata for some of the placeholders (block 220). The sending node fills in the first group of placeholders with requests to perform certain downstream processing on the digital object. These requests may be command directives expressed as metadata tags.

The sending node may fill in the second type of placeholder with conditions and attributes of the downstream processing. These conditions and attributes put restrictions on the downstream nodes. These restrictions can ensure that a downstream node has, for example, sufficient processing power and memory. They can ensure that processing tasks are performed in a certain order. They can indicate the order in which different processing tasks are performed. They can specify that processing is performed with a specific algorithm or processing module. They can require that any algorithm or method used to fulfill a request to generate metadata or alter previously-generated metadata to satisfy certain constraints. Such constraints include, but are not limited to, accuracy, false positive or false negative rate, confidence score, and Signal-to-Noise ratio.

Another attribute is priority. Data flows are asynchronous; therefore, the sending node does not control when and by whom the operations are carried out. A priority attribute can be assigned to a placeholder by a node that can carry out multiple operations.

The sending node can also fill in the third type of placeholders with hints that help with the generation of metadata by nodes that perform downstream processing. These hints could include information about the digital object or the processing that was performed. These hints could include partially generated metadata or information about the digital object or the processing that was performed. For example partial metadata about whether and where any human skin color tone pixels were detected can serve as a hint for downstream generation of human face detection metadata. Hints can include information about processing history (e.g., whether metadata was successfully extracted). Hints could include domain information about the digital object (e.g., how it was captured or created for its intended purpose).

If the sending node adds the fourth type of placeholder, it does not fill it in with metadata. The fourth type of placeholder can be filled in by nodes that perform the downstream processing.

The metadata placeholders may be implemented with XML tags that are expressed in either text or binary-encoded form. For the latter, the MPEG-7 BiM (binary format for multimedia description streams) standard may be used.

The sending node places the placeholders and digital object on the communications path (block 230). The metadata placeholders need not specify any particular downstream nodes. The requests are not explicitly targeted toward a particular downstream node. The requests can be satisfied by any downstream node that can perform the requested processing under the specified conditions.

The placeholders are sent with the digital object, independent of any network transmission of the object. That is, the placeholders are a property of the digital object, not the particular transmission thereof.

Reference is now made to FIGS. 4 and 5. A downstream node receives the digital object and placeholders via the communications path (block 410). The downstream node parses the placeholders from the digital object (block 420) and processes the digital object according to the requests, directives and conditions specified in the placeholders (block 430). The downstream node also adds hints about the processing it performed, if requested (block 440).

A downstream node can also add its own placeholders and metadata, and it can alter metadata added by upstream nodes (450). For example, a downstream node can add hints to the fourth type of placeholder, and update hints in the third type of placeholder to help with processing by nodes that are further downstream.

If all of the requested processing has been completed (block 460), the downstream node sends the processed digital object back to the sending node or other destination specified in the placeholder (block 470). If all of the requested processing has not been completed (block 460), the downstream node places the partially processed digital object and metadata placeholders back on the data communications path (block 480). This will allow another downstream node to perform additional processing.

As part of placing the digital object and placeholders on the data communications path, a digital object can be routed according to the placeholder attributes. For example, a sending node or downstream node can send the placeholders and digital object to a routing node, which can examine the placeholders in order to decide which further processing nodes to transfer the digital object to.

The nodes communicate through the metadata. However, the nodes can also communicate via other mechanisms. This would allow, for instance, a downstream node to communicate with a node that is upstream.

The metadata placeholders are static in the sense that they remain attached to a digital object during its lifecycle, not just during processing or just during any particular transmission over a communications network. The metadata placeholders remain attached to a digital object while stored in persistent storage (e.g., a hard drive). They can remain attached to a digital object after processing has been completed. They can remain attached to a digital object during subsequent processing unless explicitly deleted by the application or node. For subsequent processing, new placeholders can be added to the previous placeholders.

Reference is now made to FIG. 6, which illustrates an exemplary node 610. The node 610 includes a processor 612 and a communications interface 614. The communications interface 614 allows the processor 612 to communicate with the communications path.

The processor 612 is not limited to any particular type. As a first example, the processor 612 may include a state machine. As a second example, the processor may include a specialized processor such as a digital signal processor, and it may also include memory 616 (e.g., ROM) for storing code that causes the specialized processor to function as a sending node or a downstream node, or both.

As a third example, the processor 612 may include a general purpose processor that is programmed to function as a sending node or downstream node, or both. The general purpose processor 612 may be programmed with code that is stored in memory 616. The code can be distributed to the node as a standalone application, part of a larger program (e.g., an image editing program), a web browser plug-in, The code may be distributed (as represented by the arrow) to the node 610 via removable memory such as an optical disk, via the data communications path, etc.

In some embodiments, the node 610 may be able to generate digital objects. For example, the node 610 might include a sensor array for capturing still images or video, or a microphone for capturing sound. A node 610 might store programs for generating text and CAD documents, programs for editing photos and video, etc.

In some embodiments, the node 610 might receive digital content via the communications path or from a peripheral device. The node 610 might store the digital objects in its memory 616 and access the digital objects from its memory 616.

Different nodes may be located in the same box (e.g., all nodes may be realized as dedicated chipsets, with all chipsets in a single box). Different nodes may be at different geographic locations. Different nodes may be maintained by different parties. Different nodes may be controlled by different parties. Fees might be required for using certain downstream nodes.

Examples of nodes 610 include, but are not limited to, data capture devices (e.g., still and video cameras, scanners, cell phones, PDA), Internet appliances, computers, web servers, printers, TVs, and personal video recorders, etc.

Several examples of the system 110 will now be provided. A first example involves a text document. A computer runs a word processing application, which generates a text document and adds placeholders to the text document. The placeholders request downstream processing that includes spellchecking and summarizing the document. The computer sends the text document and placeholders on a data communication path. The document is spell checked and summarized by a chain of downstream nodes.

A second example involves a still image. A digital camera captures an image, converts the image to a JPEG file, and adds metadata placeholders to the JPEG image. The placeholders may be added to the JPEG file by inserting XML tags into JPEG image headers. The camera fills in placeholders with a request for redeye removal. The camera also fills in a placeholder to specify that the redeye removal is to be performed only by company-approved software. The camera can also add a placeholder and fill it with metadata to specify that a photographic flash was used during image capture. This last bit of information can provide a useful hint to a downstream node that performs the redeye removal.

The JPEG file and placeholders are transferred from the camera to a personal computer. The personal computer runs an image editing program that opens the JPEG file, parses the placeholders, and performs the redeye removal on the JPEG file, provided that computer uses the company-approved software. The computer then fills in a placeholder tag indicating that it performed the redeye removal.

If the computer does not have the company-approved software, it can leave the placeholder empty and send the JPEG file to another downstream node for redeye removal.

A third example involves a video clip. The video clip is generated by a camera such as a security camera, web camera, or a camcorder personal security. The camera adds metadata placeholders to the video clip and fills in placeholders with requests to perform face detection and face recognition. The placeholders specify that face detection is to be performed on all frames of a video sequence but only if the face detector can detect non-vertical-pose faces and only if the node has a certain minimum computing power and specific algorithmic implementation. A placeholder is added for human and human activity metadata. This placeholder is filled in with a hint defining the application domain as security monitoring. Downstream nodes therefore are requested to generate any metadata that they know to be not already extracted and pertinent to a security monitoring profile. The video camera sends the video clip and placeholders for downstream processing.

A first downstream node receives the video clip and placeholders. The first node cannot detect faces in images, but it can detect skin tone pixels, so it marks the regions with skin tones in a hint for future nodes that can then restrict face detection to those regions. The first node also fills in a placeholder with metadata indicating that this partial processing was performed. The first node then sends the partially processed video clip and placeholders to other nodes for further processing.

Thus, the video camera creates the video clip, but doesn't have the means to process it. A downstream node has the ability to perform partial or full processing on the video clip, but does not create the requirements. By decoupling these two functions, nodes need only partial knowledge of the nature, purpose and uses of the video clip. A consumer camera "knows" that its images are taken by consumers who would like persons to be recognized. An insurance-appraiser camera model would "know" that its images would be enriched by automatic recognition of places, cars, street signs, and weather conditions. A security camera "knows" that its imagery would be enriched by detecting human activity classes. These cameras are unlikely to have the capabilities to generate all this metadata themselves. Recording them as placeholders allows other nodes, who don't know much about the domain of these files, to perform the requested processing.

A fourth example involves large content creation: processing video in a movie post-production studio. A project (movie) is divided into clips prior to a processing workflow. Each video clip has placeholders inserted into its headers by the computer preparing the workflow. The placeholders define the operations to apply to the clips (e.g., edits, transitions, relighting, recoloring, grain reduction, etc.). A "SINK" placeholder implicitly defines the node at which the flow of the file ends. It defines what to do upon completion of the processing. The requirements for the SINK placeholder would be that all other placeholders are filled.

These clips are then released into the network. Router nodes examine a clip, identify an unfilled placeholder (e.g. recoloring) and send the clip to a node with that can perform the processing associated with the unfilled placeholder. A downstream node processes the clip, and then reroutes it until the clip is fully processed. Fully processed clips are sent to a SINK node by any router that sees that all other placeholders have been filled. All SINK nodes in the network push the clips to their final destination.

A system according to the present invention is not limited to these examples. A system according to the present invention can be applied to distributed processing of any digital object.

Thus disclosed is a system that allows metadata generation requirements to be specified at the beginning of a media flow and to be satisfied asynchronously by devices and applications further along the flow.

Use of metadata placeholders allows distributed, asynchronous metadata extraction. Media can be enhanced, enriched, annotated with metadata by any node that it passes through. Placeholders allow the guiding of which metadata operations are carried out.

Although specific embodiments of the present invention have been described and illustrated, the present invention is not limited to the specific forms or arrangements of parts so described and illustrated. Instead, the present invention is construed according to the following claims.

The invention claimed is:

1. A computer-implemented method comprising:
    adding, performed by a hardware node, metadata placeholders to digital objects, a subset of the placeholders filled with electronic requests, which are not explicitly targeted toward a particular hardware node, to perform certain asynchronous distributed downstream processing on the digital objects, at least one of the placeholders being empty so the empty placeholder is filled in by hardware nodes that perform the synchronous distributed downstream processing; and
    filling the empty placeholder as a part of the asynchronous distributed downstream processing;
    wherein the hardware nodes comprise other nodes and the adding is performed by an initial node, and wherein the requests are configured to cause the other node to initiate processing of content of the respective digital objects;
    using data communication path, communicating the digital objects with the metadata place holders to the nodes for the downstream processing after adding.

2. The method of claim 1, wherein the metadata placeholders remain attached to digital objects of the metadata placeholders throughout lifecycles of the digital objects.

3. The method of claim 1, further comprising adding metadata placeholders filled with metadata indicating conditions or attributes for the downstream processing.

4. The method of claim 1, further comprising adding metadata placeholders filled with metadata that requests a node that performs downstream processing to add metadata relating to the processing that was actually performed.

5. A computer-implemented method comprising
receiving, performed by a hardware node, a digital object and metadata placeholders via a data communications path;
identifying conditions and processing requests, which are not explicitly targeted toward a particular hardware node in the placeholders; and
processing the digital object using asynchronous distributed downstream processing of hardware nodes in accordance with the requests and conditions;
after the processing, routing the digital object to at least one downstream node according attributes of the placeholders;
wherein the received digital object is placed back on the data communications path if no processing was performed on the received digital object.

6. The method of claim 5, further comprising filling in at least one of the metadata placeholders with generated metadata in accordance with at least one directive in the placeholders.

7. The method of claim 5, further comprising, after the receiving and processing, adding metadata relating to the processing to the digital object.

8. The method of claim 5, further comprising modifying previously-generated metadata.

9. The method of claim 5, wherein the processing changes content of the digital object.

10. The method of claim 5, wherein the identifying comprises identifying after the receiving and the processing comprises processing after the identifying.

11. A hardware node comprising a processor for adding metadata placeholder to digital objects, the placeholders are configured to store the metadata comprising electronic information including requests, which are not explicitly targeted toward a particular hardware node, to perform certain asynchronous distributed downstream processing on the digital objects, at least one of the placeholders being empty so the empty placeholder is filled in by downstream hardware nodes that perform the asynchronous distributed downstream processing;
wherein the hardware nodes comprise other nodes and the adding is performed by an initial node, and wherein the requests are configured to cause the other node to initiate processing of content of the respective digital objects;
using data communication path, communicating the digital objects with the metadata place holders to the nodes for the downstream processing after adding.

12. The node of claim 11, further comprising a communications interface for sending the digital objects and placeholders to the downstream nodes.

13. The node of claim 11, wherein the downstream hardware nodes are configured to use the requests to perform the asynchronous distributed downstream processing on the respective digital objects.

14. A hardware node comprising a processor for receiving a digital object and metadata placeholders via a data communications path;
identifying conditions and processing requests, which are not explicitly targeted toward a particular hardware node, in the placeholders; and
processing the digital object using asynchronous distributed downstream processing of hardware nodes in accordance with the requests and conditions;
after the processing, routing the digital object to at least one downstream node according attributes of the placeholders;
wherein the received digital object is placed back on the data communications path if no processing was performed on the received digital object.

15. Tile node of claim 14, wherein content of at least one of the metadata placeholders specifies requirements of the node for processing the respective digital object and the processing comprises processing responsive to the requirements being satisfied by the node.

16. An article for a hardware node comprising memory having stored code causing the processor configures the hardware node to add metadata placeholders to digital objects, a subset of the placeholders including requests, which are not explicitly targeted toward a particular hardware node, to perform certain asynchronous distributed downstream processing on the digital objects, at least one of the placeholders being empty so the empty placeholder is filled in by downstream hardware nodes that perform the asynchronous distributed downstream processing;
wherein the hardware nodes comprise other nodes and the adding is performed by an initial node, and wherein the requests are configured to cause the other node to initiate processing of content of the respective digital objects;
using data communication path, communicating the digital objects with the metadata place holders to the nodes for the downstream processing after adding.

17. The article of claim 16, wherein the code also causes the processor configures the hardware node to send the digital objects and placeholders to at least one of the downstream hardware nodes.

18. The article of claim 16, wherein the code also causes the processor configures the hardware node to generate the digital object.

19. The article of claim 16, wherein the requests are configured to control the processing of the digital objects including modifying the digital objects using the downstream hardware nodes.

20. An article for a hardware node comprising memory having stored code causing the processor configures the hardware node to receive a digital object and metadata placeholders via a data communications path;
identify conditions and processing requests, which are not explicitly targeted toward a particular hardware node, in placeholders; and
process the digital object using asynchronous distributed downstream processing of downstream hardware nodes in accordance with the requests and conditions;
after the processing, routing the digital object to at least one downstream node according attributes of the placeholders
wherein the received digital object is placed back on the data communications path if no processing was performed on the received digital object.

21. The article of claim 20 wherein the code comprises code for causing the processor configures the hardware node to process the digital object in accordance with the requests and conditions to change content of the digital object.

* * * * *

UNITED STATES PATENT AND TRADEMARK OFFICE
CERTIFICATE OF CORRECTION

PATENT NO. : 8,782,002 B2
APPLICATION NO. : 11/280518
DATED : July 15, 2014
INVENTOR(S) : Ullas Gargi et al.

It is certified that error appears in the above-identified patent and that said Letters Patent is hereby corrected as shown below:

In the Claims:

In column 6, line 51, in Claim 1, delete "synchronous" and insert -- asynchronous --, therefor.

In column 6, line 60, in Claim 1, delete "place holders" and insert -- placeholders --, therefor.

In column 7, line 10, in Claim 5, delete "node" and insert -- node, --, therefor.

In column 7, line 36, in Claim 11, delete "placeholder" and insert -- placeholders --, therefor.

In column 7, line 50, in Claim 11, delete "place holders" and insert -- placeholders --, therefor.

In column 8, line 10, in Claim 15, delete "Tile" and insert -- The --, therefor.

In column 8, line 31, in Claim 16, delete "place holders" and insert -- placeholders --, therefor.

In column 8, line 50, in Claim 20, before "placeholders" insert -- the --.

Signed and Sealed this
Eighteenth Day of November, 2014

Michelle K. Lee
*Deputy Director of the United States Patent and Trademark Office*